3 Sheets—Sheet 1.

J. F. SEIBERLING.

Harvester.

No. 8,641. Reissued Mar. 25, 1879.

WITNESSES
Franck L. Durand
John G. Center

By

INVENTOR
John F. Seiberling
A. M. Smith
ATTORNEY

N. PETERS, PHOTO-LITHOGRAPHER, WASHINGTON, D. C.

3 Sheets—Sheet 2.

J. F. SEIBERLING.

Harvester.

No. 8,641. Reissued Mar. 25, 1879.

WITNESSES

Franck L. Durand

John G. Center

INVENTOR

John F. Seiberling

By

A. M. Smith

ATTORNEY

N. PETERS, PHOTO-LITHOGRAPHER, WASHINGTON, D. C.

J. F. SEIBERLING.

Harvester.

No. 8,641. Reissued Mar. 25, 1879.

WITNESSES
Franck L. Durand
John G. Center

By

INVENTOR
John F. Seiberling
S. M. Smith
ATTORNEY

N. PETERS, PHOTO-LITHOGRAPHER, WASHINGTON, D. C.

UNITED STATES PATENT OFFICE.

JOHN F. SEIBERLING, OF AKRON, OHIO.

IMPROVEMENT IN HARVESTERS.

Specification forming part of Letters Patent No. 139,268, dated May 27, 1873; Reissue No. 8,641, dated March 25, 1879; application filed December 3, 1878.

*To all whom it may concern:*

Be it known that I, JOHN F. SEIBERLING, of Akron, county of Summit, State of Ohio, did invent certain new and useful Improvements in Harvesters, of which the following is a full, clear, and exact description, reference being had to the accompanying drawings, making part of this specification, in which—

Figure 1:
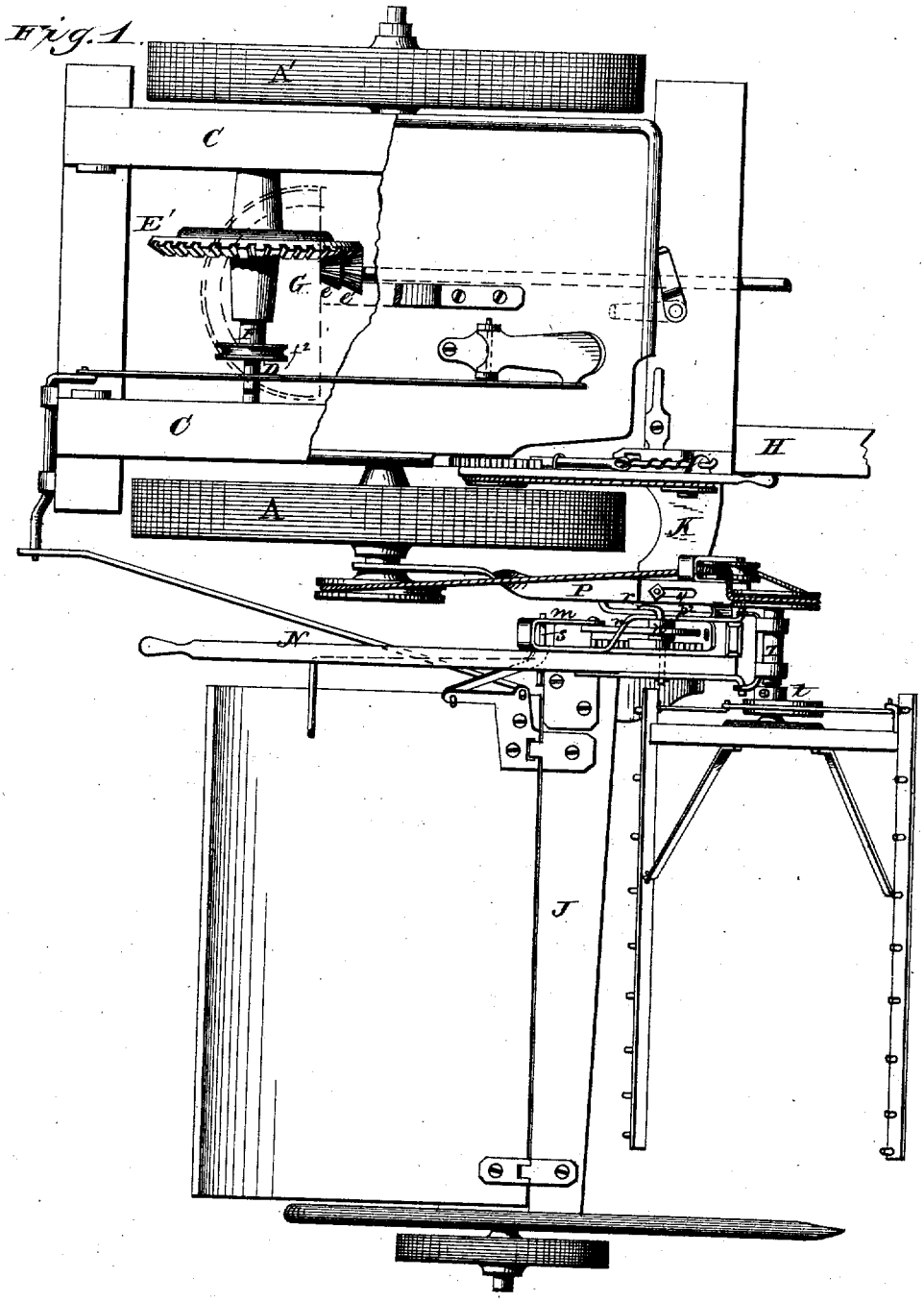
Figure 2:
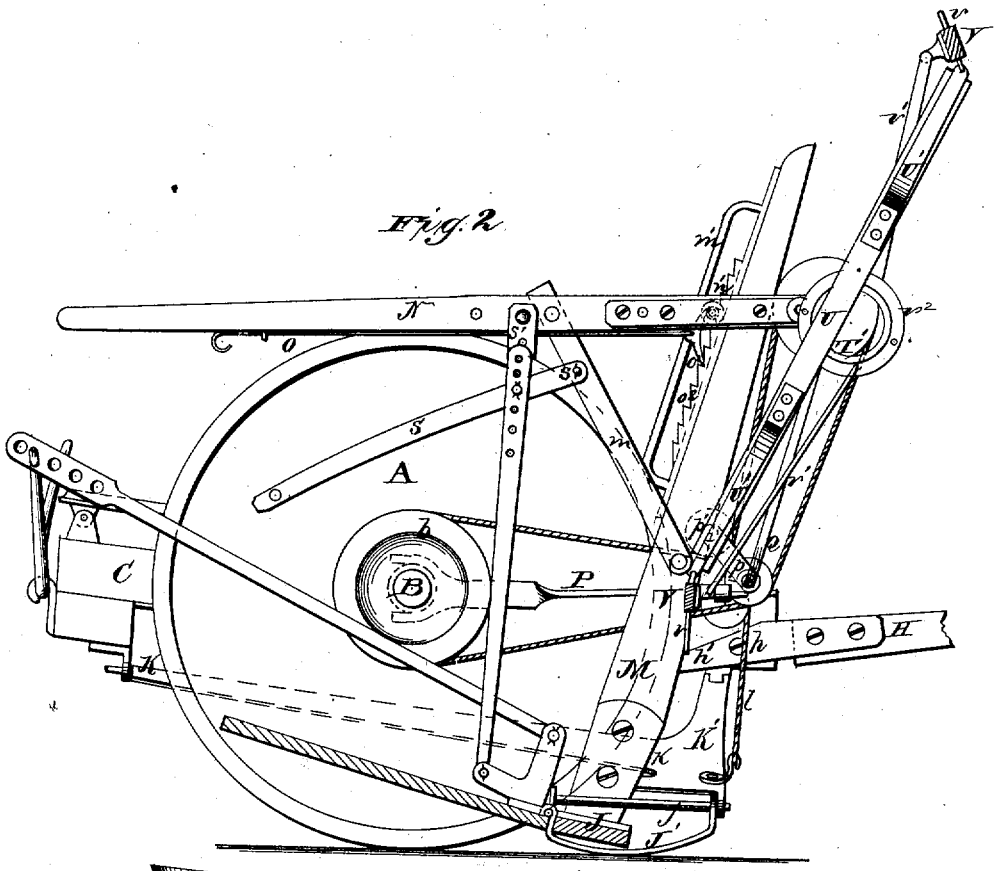
Figure 3:
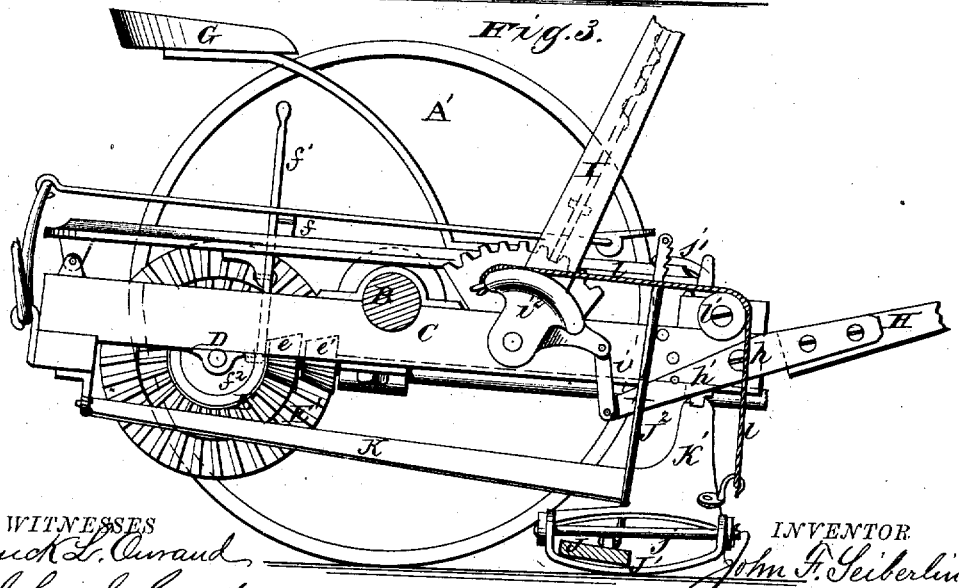
Figure 4:
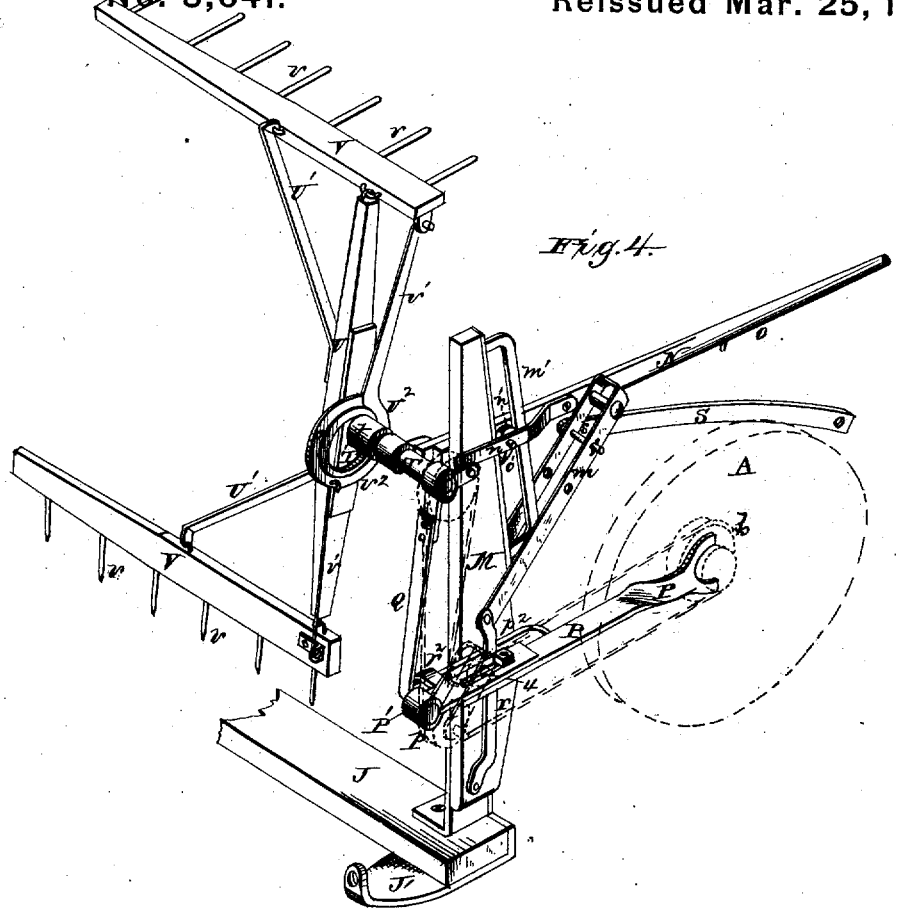
Figure 5:
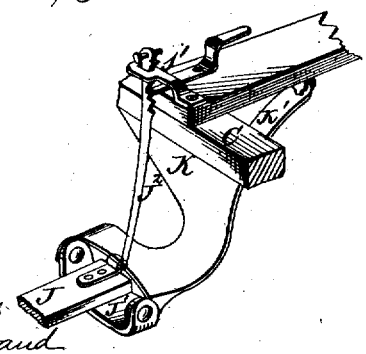

Figure 1 represents a plan or top view of so much of my improved machine as is necessary to illustrate the invention herein claimed, with a portion of the platform broken away. Fig. 2 represents a view, in elevation, as seen from the divider side of the machine, with the reel, finger-beam, and platform in section. Fig. 3 represents a similar view of the machine, arranged for mowing, with the reel and platform removed. Fig. 4 represents a view, in perspective, of the reel, finger-beam, and cut-off, with their attachments; Fig. 5, a similar view of the ratchet-link that connects the finger-beam rigidly with the frame.

Similar letters of reference denote corresponding parts wherever used.

The first part of my invention relates more especially to a two-wheel front-cut hinged-bar harvester of that class in which the finger-beam is hinged to a coupling-frame, which is in turn hinged to the main frame in such a manner that the finger-beam may rise and fall to conform to inequalities of the ground over which it passes without disturbing the main frame.

The object of this part of my invention is to enable the driver to rock the finger-beam by raising or lowering the front end of the main frame; and the improvement consists in combining a main frame oscillating on the main axle, a tongue pivoted to the front of said frame, a lifting-lever connected with said tongue by a link, a detent to lock the lever and tongue, and a finger-beam pivoted to a coupling-frame, in turn pivoted to the main frame.

The object of the next part of my invention is to enable the driver both to rock and to raise or lower the finger-beam simultaneously by a single lever; and the improvement consists in combining with the devices just above mentioned a lifting chain or cord, connecting the coupling-frame with a sector on the pivot of the lifting-lever.

The object of the next part of my invention is so to lock the finger-beam, when desired, as to prevent its divider end from dropping below its normal plane, and also to lift the divider end of the finger-beam by the mere act of lifting its inner end; and the improvement consists in combining with the elements above mentioned a ratchet-link, pivoted at one end to an extension of the finger-beam, while the other works through a guide on the frame. When loose this link allows the finger-beam to rise and fall freely. When locked it prevents the dropping of the outer end of the finger-beam; and when the coupling-frame is lifted the link tilts the divider end of the finger-beam.

The next part of my invention relates to a reel capable of being raised or lowered by the driver, and constitutes an improvement on my patent of August 1, 1871, No. 117,692.

The improvements relating to this part of my invention consist in mounting the reel on a lever supported by an arm or brace, pivoted at one end to the lever and at the other to the reel-post or shoe, so that the fulcrum of the lever may vibrate, so as to allow the reel to be raised and lowered on a straight line, or nearly so, with the post, and thus secure the proper motion for the reel; in combining with the reel, its supporting-lever, and pivoted arm a guide on the reel-post to keep the parts in proper relation; in making the tension-arm adjustable to vary the tension of the reel-band; in combining the adjustable reel with a jointed tension-arm, pivoted at one end at or near the reel-driving shaft, for keeping the driving-belt at a nearly uniform tension; in combining the jointed tension-arm with the lever for raising and depressing the reel; and in combining with the jointed tension-arm a guide for maintaining said arm in proper relation to the other parts.

My invention further consists in combining with the adjustable reel a cut-off pivoted near the fulcrum of the reel-support, instead of on the reel itself.

My invention further consists in combining an adjustable reel, a cut-off pivoted near the fulcrum of the lever which carries the reel, and a dropping-platform, by whose vibrations the cut-off is operated.

The accompanying drawings show all the improvements hereinbefore mentioned as embodied in the well-known "Excelsior" harvester heretofore patented by me, and manufactured in large numbers. Obviously, however, some of these improvements may be used without the others, and on machines differing in construction from the one herein described.

Driving-wheels A A′, mounted on an axle, B, support a main frame, C. The countershaft D is driven from the main axle or driving-wheels by well-known gearing. The cutters are driven in the usual way by a crank and pitman. A seat, G, for the driver, is mounted upon the main frame.

The tongue H, instead of being fastened rigidly to the frame, as usual in machines of this class, is pivoted to the inner front corner thereof by a bolt, *h*, so that the tongue may be moved up or down on this bolt as a fulcrum, as described.

The heel end *h′* of the tongue projects back of the pivot *h*. A link, *i*, connects this extension-piece or heel end with the arm of a sector-lever, I, pivoted on the main frame, controlled by the driver, and held in any desired position by the usual ratchet and spring detent. The finger-beam J, in this instance, is united at its heel end to a shoe, $J^1$, pivoted, by a bolt, *j*, to lugs on a coupling-frame, one arm, K, of which is pivoted in rear of the axle, and forms a thrust-bar, while the other, K′, is hinged near the middle of the front end of the main frame, and forms a coupling arm or brace.

As the tongue of the machine is held at a uniform elevation (substantially) by the neck-yoke, it follows that, as the driver raises or lowers the front end of the main frame by rocking the sector-lever I, the points of the guard-fingers correspondingly will be tipped by the rocking of the main frame on its axle, and also raised and lowered when the bar is elevated for reaping, which is very beneficial in passing over obstacles or cutting fallen crops.

A cord or chain, *l*, connected with the coupling-frame passes over a pulley, *l′*, on the frame, and over a sector, $i^2$, on the lever I.

By this mode of construction the coupling-frame and finger-beam can quickly be lifted, as the front of the main frame rises simultaneously with the coupling-frame, owing to the rocking of the tongue on its pivots *h* and the frame on its axle, by means the sector-lever, as hereinafter explained. Both these movements, it will be observed, are effected by a single lever.

A ratchet-link, $J^2$, hinged to the inner end of the finger-beam, which projects beyond its pivot *j*, extends upward through a slotted plate, *j′*, on the main frame. When free, this link allows the finger-beam freely to play up and down at either end; but when the ratchets on the link engage with the plate *j′* the heel end of the finger-beam, while free to rise, is prevented from falling below a given point. When thus locked, if the coupling-frame be raised the link will keep the heel end of the divider down, while its divider end is lifted by the rising of the coupling-frame, which is advantageous in passing over stumps, stones, and other obstructions.

The machine thus far described is organized as a mower. For reaping I mount a reel-post, M, on the shoe or finger-beam. An arm or radius-bar, *m*, is pivoted at one end to this post, or it may be pivoted to the shoe, and at the other to the lever N, which supports the reel. A forked bracket, *n*, on this lever embraces the reel-post and supports the reel in suitable bearings on its front end. A guide-roller, *n′*, in this bracket runs in a guideway between the reel-post and a guide-rail, *m′*, behind it, and thus serves to keep the reel, lever, and radius-bar in proper relation to the post. The radius-bar increases the range of adjustment of the reel, and allows the reel to be raised and lowered in nearly a straight line by vibrating or raising and lowering the fulcrum of the supporting-levers.

A rod, *o*, connected to a pawl, $o^1$, moved by the driver, throws the pawl $o^1$ in or out of gear with a rack, $o^2$. This rack may be variously arranged, but in this instance is located on the reel-post, and thus locks or releases the lever.

An overhung reel is mounted in bearings on the lever N, as above mentioned, and driven by a band and pulleys, in a manner somewhat similar to that described in my patent of August 1, 1871, hereinbefore mentioned. The tension of this band, however, is maintained in a different way from that shown in that patent.

A tension-arm, made in two parts, P Q, has the part P pivoted at or near, and adapted to vibrate around, the axle, with the part Q depending from the reel-supports or lever N, pivoted to its forward end, as shown. The tension-pulleys *p* $p^1$ are mounted in a frame pivoted to these arms at or near their point of intersection.

The reel-band passes around a pulley, *b*, on the main axle, the tension-pulleys, and the reel-pulley, as usual.

As the tension-pulleys always move with the arm P in an arc of which the main axle B forms the center, and as the arm Q always keeps one of the tension-pulleys at the same distance from the reel-axis, the tension of the belt remains uniform, however much the reel may be raised or lowered.

In order to adjust the tension of the belt, the tension-arm is made in two sections, connected by a set-screw, working in a long slot, 4. (See Figs. 1 and 4.) To retain this arm in proper relation to the reel-post, a rail, $p^2$, on the arm is passed through a guide-rail, $r$, and the outer end of the sliding section P′ of the arm is made with a ferrule, $r^2$, which slides over the rail $p^2$. The rail thus serves as an additional support or connection between the two pieces, without interfering with the adjustment of the tension-arm.

A dropping platform is combined with my machine in the way described in my patent above referred to. I also use a cut-off in combination with my reel; but, instead of pivoting this cut-off near the reel-axis, I pivot it behind said axis, and near the fulcrum of the adjusting-lever N, and make it adjustable either on the lever or lever-support, as shown in Fig. 2. The cut-off arm S, in this instance, is pivoted at $s$ to the radius-arm or lever-support $m$, and operated by the platform, as in my previous patents. It may, however, be pivoted directly to the adjusting-lever N, and may be adjusted thereon by means of a series of holes in the lever, in any one of which holes a clip, $s'$, may be secured, the cut-off rod being attached to the clip. A cut-off, combined, as above described, with a reel-supporting lever, moves away from the reel in rising, and consequently requires less range of motion in clearing the grain than it would if pivoted on the reel-axis, besides being shorter, lighter, stiffer, and more easily operated.

While I regard myself as the original and first inventor of the method of pivoting the cut-off near the fulcrum of the reel-supporting lever, I yet concede that the specific position in which the cut-off is pivoted on the reel-supporting lever in rear of its fulcrum, described and claimed in the application of Daniel F. Luse, filed September 4, 1872, is the invention of said Luse, although subsequent in date to my invention of pivoting the cut-off near the fulcrum in the other positions shown.

The reel is of that type denominated an "overhung" reel, being supported in bearings at its inner end only, and its shaft in this instance turns in a long tubular bearing, T, resting in eyes on the forked bracket of the adjusting-lever. A collar, $t$, encircles the outer projecting end of this bearing, and is clamped thereon by a set-screw. An eccentric, T′, is fixed on this collar. The arms U of the reel are fast on their shaft, as usual.

The ribs V are provided with teeth $v$, and are hinged to the arm U and their braces $u'$ by eyes, which allow the ribs freely to swing. The inner ends of the ribs are connected by links $v^1$ with a ring, $v^2$, turning on the eccentric T′. The effect of this arrangement is that the teeth dip into the grain in a position nearly perpendicular, and retain that position while sweeping the grain back onto the platform. By this arrangement the standing grain is not only nicely reeled back upon the platform, but by dropping the reel down the teeth on the reel-ribs will pick up the lodged grain and reel it back onto the platform.

The operation of the machine and its several devices will readily be understood from the foregoing description.

Having now described my invention, what I claim as new, and desire to secure by Letters Patent, is—

1. The combination of the main frame oscillating on the main axle, the tongue hinged to the front inner corner of said frame, the lifting-lever pivoted on the frame and linked to the tongue, the locking-detent, the hinged coupling-frame, and the finger-beam, these members being constructed and operating substantially as hereinbefore set forth to rock the guard-fingers.

2. The combination of the oscillating main frame, hinged tongue, coupling-frame, and finger-beam with the lifting-lever, link, and chain, these members being constructed and operating substantially as hereinbefore set forth, to rock and lift the inner end of the finger-beam simultaneously by a single lever.

3. The combination of the main frame, hinged tongue, coupling-frame, finger-beam, lifting-lever, and chain with the ratchet-link hinged to the finger-beam and acting on the main frame, these elements being constructed and operating substantially as hereinbefore set forth, to lock and tilt the finger-beam.

4. The combination of the reel-post, the pivoted supporting radius-arm, the lever pivoted to the arm, and the reel mounted on the lever, these elements being constructed and operating substantially as hereinbefore set forth, to render the fulcrum of the lever adjustable.

5. The combination of the reel, its supporting-lever, and pivoted supporting radius-arm with the guide-rail on the reel-post and a guide-pin on the lever, these parts being constructed and operating in combination, substantially as hereinbefore set forth, to secure the proper relation between the supporting-lever and reel-post.

6. The longitudinally-adjustable sectional tension-arm constructed with a guide-rail and ferrule, and operating substantially as set forth.

7. The jointed tension-arm for maintaining the tension of the reel-driving belt, hinged at or near the axle or reel-driving shaft, in combination with means for adjusting the reel while the machine is in operation, substantially as and for the purpose described.

8. The combination of the jointed tension-arm, which connects the reel with its driving-shaft, with the lever for adjusting the reel relatively to the cutters when the machine is in operation.

9. The overhung reel mounted in a bearing or bearings on an adjusting-lever, connected by a jointed tension-arm with the reel-driving shaft, for permitting the adjustment of the reel without disturbing the tension of the driving-belt.

10. The combination of the tension-arm, vibrating around the reel-driving axle, with a guide-rail, substantially as hereinbefore set forth.

11. The combination, with the adjustable reel, of the cut-off, pivoted near the fulcrum of the reel-supporting lever, substantially as hereinbefore set forth.

12. The combination of the reel, the supporting-lever, the cut-off hinged near the fulcrum of the lever, and the dropping platform, substantially as hereinbefore set forth.

JOHN F. SEIBERLING.

Witnesses:
W. H. CARTER,
S. B. JACOBS.